(12) United States Patent
Munoz

(10) Patent No.: US 11,485,610 B2
(45) Date of Patent: Nov. 1, 2022

(54) ELEVATOR SAFETY ACTUATOR

(71) Applicant: OTIS Elevator Company, Farmington, CT (US)

(72) Inventor: Ruben Sanchez Munoz, Toledo (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 959 days.

(21) Appl. No.: 16/252,310

(22) Filed: Jan. 18, 2019

(65) Prior Publication Data
US 2019/0248627 A1 Aug. 15, 2019

(30) Foreign Application Priority Data
Feb. 15, 2018 (EP) ..................... 18382089

(51) Int. Cl.
*B66B 5/18* (2006.01)
*F16D 63/00* (2006.01)
*F16D 121/22* (2012.01)

(52) U.S. Cl.
CPC .............. *B66B 5/18* (2013.01); *F16D 63/002* (2013.01); *F16D 2121/22* (2013.01)

(58) Field of Classification Search
CPC ......... B66B 5/18; B66B 1/36; F16D 2121/18; F16D 2121/20; F16D 2121/22; F16D 59/02; F16D 63/002; F16D 63/006
USPC ........................................ 188/161, 163, 164
See application file for complete search history.

(56) References Cited

U.S. PATENT DOCUMENTS

| | | | |
|---|---|---|---|
| 3,741,353 A | 6/1973 | McKinley et al. | |
| 4,484,666 A | 11/1984 | Steinmetz et al. | |
| 5,199,532 A | 4/1993 | Suganuma et al. | |
| 5,467,850 A | 11/1995 | Skalski | |
| 5,518,087 A | 5/1996 | Hwang et al. | |
| 5,535,853 A | 7/1996 | Skalski | |
| 5,628,385 A | 5/1997 | Yumura et al. | |
| 6,471,017 B1 | 10/2002 | Booz et al. | |
| 7,896,139 B2 | 3/2011 | Syrman et al. | |
| 8,281,906 B2 | 10/2012 | Hesl | |
| 9,376,295 B2 | 6/2016 | Piech et al. | |
| 10,781,075 B2 * | 9/2020 | Witczak | B66B 5/18 |

(Continued)

FOREIGN PATENT DOCUMENTS

| | | |
|---|---|---|
| CN | 1111501 C | 6/2003 |
| JP | 2008254837 A | 10/2008 |

(Continued)

OTHER PUBLICATIONS

Search Report dated Aug. 20, 2018, EP Application No. 18382089.3, 25 pages.

*Primary Examiner* — Diem M Tran
(74) *Attorney, Agent, or Firm* — Cantor Colburn LLP

(57) ABSTRACT

A bi-stable brake actuator is provided and includes a fixed core movable in a first direction, a coil disposed in the fixed core and configured to generate magnetic fields of opposite polarities when supplied with opposing currents, respectively, a movable core disposed to move between retracted and extended positions with respect to the fixed core and the coil in exclusively a second direction defined orthogonally with respect to the first direction and a permanent magnet assembly. The permanent magnet assembly is disposed to move between first and second positions in accordance with the coil being supplied with the opposing currents, respectively.

20 Claims, 3 Drawing Sheets

(56) References Cited

U.S. PATENT DOCUMENTS

2016/0236904 A1    8/2016   Witczak et al.
2017/0129741 A1    5/2017   Hu et al.

FOREIGN PATENT DOCUMENTS

| WO | 2011069804 A1 | 6/2011 | |
| WO | WO-2017087978 A1 * | 5/2017 | ............... B66B 5/04 |

* cited by examiner

ELEVATOR SAFETY ACTUATOR

CROSS REFERENCE TO RELATED APPLICATION

This patent application claims priority to European Patent Application Serial No. 18382089.3, filed Feb. 15, 2018, which is incorporated herein by reference in its entirety.

BACKGROUND

The following description relates to elevator safety actuators and, more specifically, elevator safety actuators for use with elevator systems having relatively large airgaps between the elevator safety actuators and the guide rails.

In elevator systems, elevator brakes are safety devices that are used to stop an elevator from falling too fast. Elevator brakes work by detecting whether the elevator is descending or accelerating faster than its maximum designed speed and, if this happens, to activate brake shoes which clamp down along the vertical rails in the elevator shaft. This action stops the elevator from falling quickly but not so abruptly as to cause injury.

Modern elevator brakes sometimes make use of magnetic actuators in safety brakes but this may require that the gap between the actuators and the rails be well defined. In practice, however, the actual gap can vary depending on various factors such as relative sizes of the actuators and the guide rails as well as machining tolerances. Thus, elevator brakes are often designed with sliding guides to reduce excessive gaps but such features may result in the introduction of noise and wear.

BRIEF DESCRIPTION

According to an aspect of the disclosure, a bi-stable brake actuator is provided and includes a fixed core movable in a first direction, a coil disposed in the fixed core and configured to generate magnetic fields of opposite polarities when supplied with opposing currents, respectively, a movable core disposed to move between retracted and extended positions with respect to the fixed core and the coil in exclusively a second direction defined orthogonally with respect to the first direction and a permanent magnet assembly. The permanent magnet assembly is disposed to move between first and second positions in accordance with the coil being supplied with the opposing currents, respectively.

In accordance with additional or alternative embodiments, the movable core includes at least one of first permanent magnets facing the permanent magnet assembly and second permanent magnets facing the fixed core.

In accordance with additional or alternative embodiments, the permanent magnet assembly includes a housing and first and second braking permanent magnets at opposite ends of the housing.

In accordance with additional or alternative embodiments, an elastic element is interposed between the fixed core and the movable core.

In accordance with additional or alternative embodiments, the fixed core is formed to define a first cavity sized to accommodate the coil and the movable core and the coil is formed to define a second cavity sized to accommodate the movable core and shaped to guide movements of the movable core between the retracted and extended positions.

In accordance with additional or alternative embodiments, the second direction is perpendicular with respect to the first direction.

In accordance with additional or alternative embodiments, circuitry to which the coil is electrically coupled includes a current source and a controller to supply the coil with one of the first and second currents from the current source.

According to an aspect of the disclosure, a bi-stable brake actuator is provided for an elevator system in which an elevator car moves along a guide rail. The bi-stable safety actuator includes a fixed core fixed to and movable with the elevator car in a first direction, a coil disposed in the fixed core and configured to generate magnetic fields of first and second opposite polarities when supplied with first and second currents, respectively, a movable core disposed to move between retracted and extended positions with respect to the fixed core and the coil in exclusively a second direction defined orthogonally with respect to the first direction and a permanent magnet assembly. The permanent magnet assembly is movably coupled to the elevator car and disposed to move between movable core and guide rail abutment positions in accordance with the coil being supplied with the first and second currents, respectively.

In accordance with additional or alternative embodiments, the movable core includes at least one of first permanent magnets facing the permanent magnet assembly and second permanent magnets facing the fixed core.

In accordance with additional or alternative embodiments, the permanent magnet assembly includes a housing and first and second braking permanent magnets at opposite ends of the housing.

In accordance with additional or alternative embodiments, an elastic element is interposed between the fixed core and the movable core.

In accordance with additional or alternative embodiments, the fixed core is formed to define a first cavity sized to accommodate the coil and the movable core.

In accordance with additional or alternative embodiments, the coil is formed to define a second cavity sized to accommodate the movable core and shaped to guide movements of the movable core between the retracted and extended positions.

In accordance with additional or alternative embodiments, the second direction is perpendicular with respect to the first direction.

In accordance with additional or alternative embodiments, circuitry is provided to which the coil is electrically coupled.

In accordance with additional or alternative embodiments, the circuitry includes a current source and a controller to supply the coil with one of the first and second currents from the current source.

In accordance with additional or alternative embodiments, a distance between the permanent magnet assembly and the guide rail is from a lower range of a non-zero length to 0.5 mm and up to and including an upper range of 3.6 mm or greater.

According to an aspect of the disclosure, a method of operating an elevator system is provided. The method includes moving a first assembly in a first direction with a second assembly magnetically abutting the first assembly, detecting that a brake condition is in effect, magnetically disengaging the second assembly from the first assembly and driving the second assembly away from the first assembly, guiding movement of a movable core from the first assembly to the second assembly in exclusively a second direction which is orthogonal to the first direction and urging the second assembly toward magnetic abutment with the first assembly. The urging of the second assembly toward magnetic abutment with the first assembly includes guiding movement of the movable core toward the first assembly in exclusively the second direction.

In accordance with additional or alternative embodiments, the magnetically disengaging the second assembly from the first assembly and the urging of the second assembly toward magnetic abutment with the first assembly include supplying a coil in the first assembly with opposing currents.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an elevator safety brake is provided with a bi-stable electromagnetic actuator. The bi-stable electromagnetic actuator allows for movement in a direction which is orthogonal to the actuator axis. That is, the bi-stable electromagnetic actuator includes a movable core that has been split to allow for movement of the complete movable core assembly in an axial direction while also allowing for orthogonal movement of only the movable core towards the guide rail. The configuration of the bi-stable electromagnetic actuator increases an attraction between the bi-stable electromagnetic actuator and the movable core and thereby improves performance of the elevator safety brake for small or large gaps.

Figure 1:
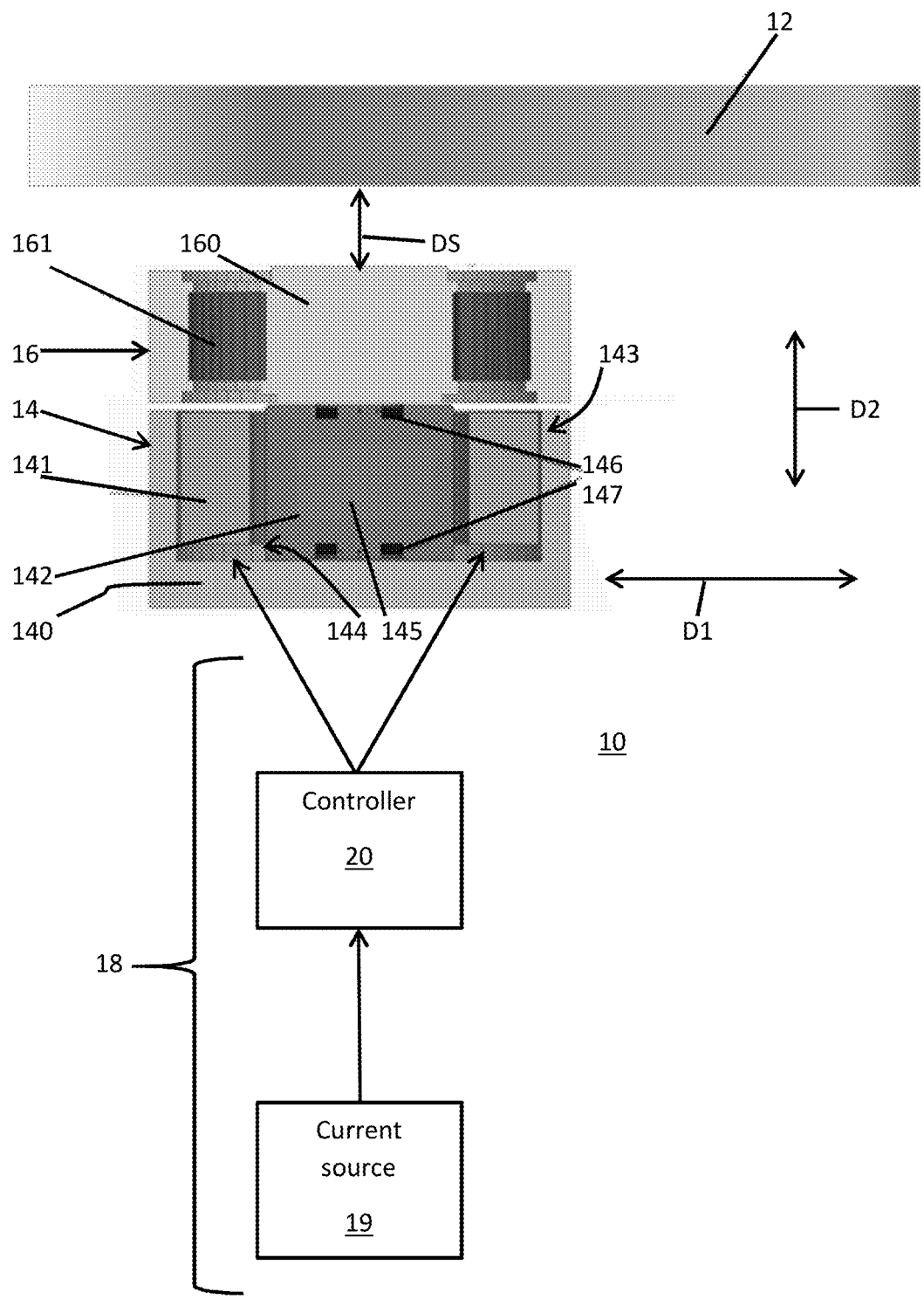
FIG. 1 is a side schematic view of a bi-stable safety actuator for use with an elevator system in accordance with embodiments.

With reference to FIG. 1, a bi-stable safety brake actuator 10 is provided for an elevator system in which an elevator car moves along a guide rail 12. The bi-stable safety brake actuator 10 includes a fixed core assembly 14 and a permanent magnet assembly 16. The fixed core assembly 14 includes a fixed core 140, a coil 141 and a movable core 142. The fixed core 140 is fixed to and movable with the elevator car in a first direction D1, which is defined in parallel with the longitudinal axis of the guide rail 12. The fixed core 140 may be formed of ferromagnetic material and is formed to define a first cavity 143. The coil 141 is disposed in the first cavity 143 of the fixed core 140, is formed to define a second cavity 144 and is electrically coupled to circuitry 18. The circuitry 18 includes a current source 19 and a controller 20. The controller 20 is configured to supply one of first and second currents from the current source 19 to the coil 141. The coil 141 is configured to generate magnetic fields of first and second opposite polarities when supplied with the first and second currents, respectively. The movable core 142 is disposed to occupy and move between a retracted position at which the movable core 142 is entirely contained within the second cavity 144 (with the coil 141 disposed about the movable core 142) and an extended position at which the movable core 142 is partially contained within the second cavity 144.

The movable core 142 includes a cylindrically or rectangular volumetric body 145 of ferromagnetic material and low reluctance and at least one of a first pair of permanent magnets 146 and a second pair of permanent magnets 147. In accordance with embodiments, the description provided herein will generally relate to the movable core 142 being substantially cylindrical. This is done for purposes of clarity and brevity and not to otherwise limit the scope of the description in any manner. The first pair of permanent magnets 146 are secured to a first side of the volumetric body 145 to face the permanent magnet assembly 16. The second pair of permanent magnets 147 are secured to a second side of the volumetric body 145 to face the fixed core 140. With the movable core 142 disposed in the retracted position, the second pair of permanent magnets 147 are magnetically attracted to the fixed core 140.

It is to be understood that the first pair of permanent magnets 146 and that the second pair of permanent magnets 147 may be provided as singular ring elements disposed about a central longitudinal axis of the movable core 142. Thus, the first pair of permanent magnets 146 may include or be provided as a first permanent magnet ring 146 and the second pair of permanent magnets 147 may include or be provided as a second permanent ring 147.

In one embodiment, the first pair of permanent magnets 146 and the second pair of permanent magnets 147 may be any desired shape.

In some cases, an elastic element 148 (see FIGS. 2D and 2E) may be interposed between the fixed core 140 and the movable core 142. The elastic element 148 may be a spring and is configured to urge the movable core 142 toward the extended position.

Due to the shape of the second cavity 144, movements of the movable core 142 are limited to those movements between the retracted and extended positions with the direction of those movements being defined in exclusively a second direction D2. The second direction D2 is defined orthogonally or, more particularly, perpendicularly with respect to the first direction D1.

The permanent magnet assembly 16 includes a housing 160 and first and second braking permanent magnets 161 at opposite longitudinal ends of the housing 160. The permanent magnet assembly 16 is movably coupled to the elevator car and is disposed to occupy and to move between a movable core abutment position at which the permanent magnet assembly 16 is magnetically attracted to the first pair of permanent magnets 146 and thus magnetically abuts with the movable core 142 and the fixed core 140 and guide rail abutment positions at which the permanent magnet assembly 16 is magnetically attracted to the guide rail 12 and thus magnetically abuts with the guide rail 12 to actuate a braking mechanism. The movements of the permanent magnet assembly 16 between the movable core and guide rail abutment positions may be governed in accordance with the coil 141 being supplied with the first and second currents, respectively.

In accordance with embodiments and, as shown in FIG. 1, a distance DS between the permanent magnet assembly 16 and the guide rail 12 particularly when the permanent magnet assembly 16 is disposed in the movable core abutment position ranges from a lower range of a non-zero length to 0.5 mm and up to and including an upper range of 3.6 mm or greater.

With continued reference to FIG. 1 and with additional reference to FIGS. 2A-2F, a method of operating the bi-stable safety brake actuator 10 of FIG. 1 will now be described.

Figure 2A:
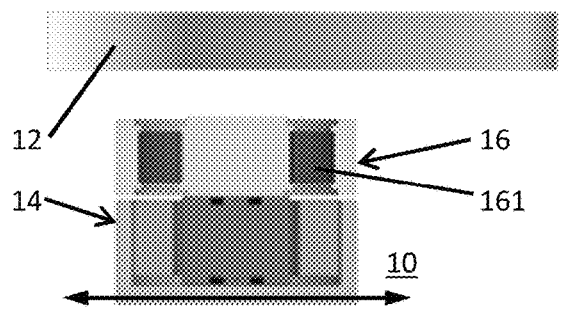
FIG. 2A is a side schematic view of the bi-stable safety actuator of FIG. 1 at an initial operational time.

As shown in FIGS. 1 and 2A, the bi-stable safety brake actuator 10 is provided in a resting position. The fixed core assembly 14 and the permanent magnet assembly 16 both travel along the guide rail 12 in the first direction D1. The permanent magnet assembly 16 is prevented from movement from the movable core abutment position by the magnetic attraction between the permanent magnet assembly 16 and the first pair of permanent magnets 146 and by the magnetic attraction between the second pair of permanent magnets 147 and the fixed core 140.

Figure 2B:
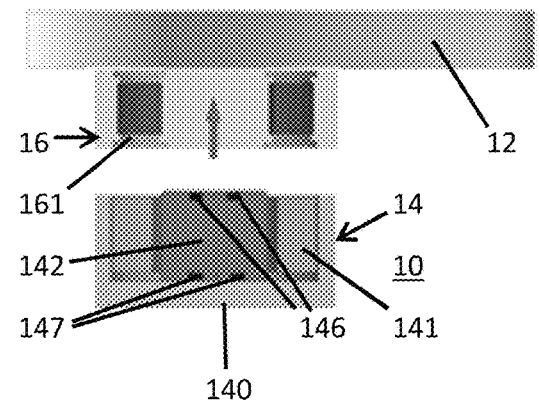
FIG. 2B is a side schematic view of the bi-stable safety actuator of FIG. 1 at an intermediate operational time.

As shown in FIGS. 1 and 2B, the coil 141 is energized with the first current from the circuitry 18 in order to deploy or drive the permanent magnet assembly 16 from the movable core abutment position to the guide rail abutment position at which the permanent magnet assembly 16 magnetically abuts with the guide rail 12. The energization of the coil 141 with the first current causes the coil 141 to generate a magnetic field which has a same polarity as the first and second braking permanent magnets 161 and thus creates a repulsive force between the fixed core assembly 14 and the permanent magnet assembly 16 which overcomes the magnetic attraction between the permanent magnet assembly 16 and the first pair of permanent magnets 146 and the fixed core 140.

Figure 2C:
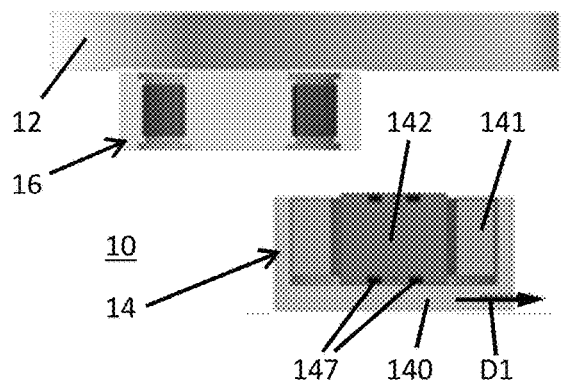
FIG. 2C is a side schematic view of the bi-stable safety actuator of FIG. 1 at an intermediate operational time.

At this point, as shown in FIG. 2C, the permanent magnet assembly 16 magnetically abuts with the guide rail 12 but the movable core 142 remains disposed in the retracted position due to residual current in the coil 141 and the magnetic attraction between the second pair of permanent magnets 147 and the fixed core 140. As such, the fixed core assembly 14 can continue to travel along the guide rail 12 in the first direction D1.

Figure 2D:
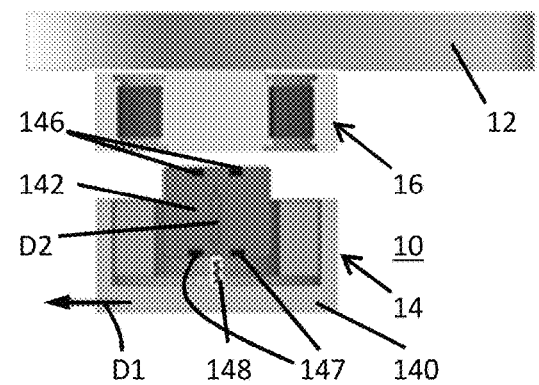
FIG. 2D is a side schematic view of the bi-stable safety actuator of FIG. 1 at an intermediate operational time.

As shown in FIG. 2D, once the fixed core assembly 14 returns to the position of the permanent magnet assembly 16 and after safety brakes disengage, a magnetic attraction between the permanent magnet assembly 16 and the first pair of permanent magnets 146 overcomes the magnetic attraction between the second pair of permanent magnets 147 and the fixed core 140. This results in the movable core 142 beginning to move from the retracted position toward the extended position along the second direction D2. The elastic element 148 may facilitate or otherwise assist in this movement.

Figure 2E:
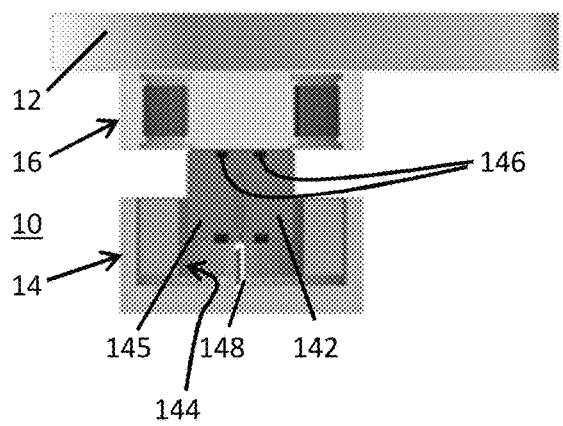
FIG. 2E is a side schematic view of the bi-stable safety actuator of FIG. 1 at an intermediate operational time.
Figure 2F:
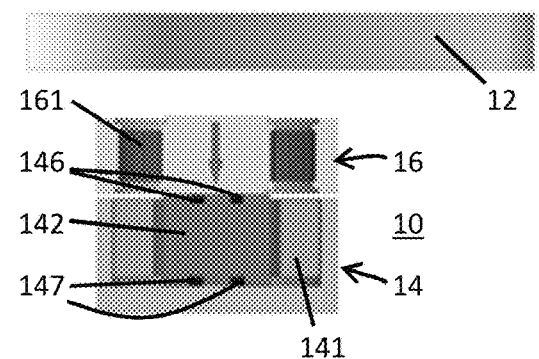
FIG. 2F is a side schematic view of the bi-stable safety actuator of FIG. 1 at a late operational time.

As shown in FIG. 2E, the movable core 142 is completely deployed or driven toward the extended position at which the movable core 142 magnetically abuts with the permanent magnet assembly 16. Here, the second side of the volumetric body 145 remains disposed in the second cavity 144 whereby the configuration of the second cavity 144 constrains the movement of the movable core 142 to remain movement in exclusively the second direction D2.

As shown in FIGS. 1 and 2E, the coil 141 is energized with the second current from the circuitry 18 in order to disengage the permanent magnet assembly 16 from the guide rail 12 and to drive or attract the permanent magnet assembly 16 with the movable core 142 magnetically coupled thereto toward the fixed core assembly 14. The energization of the coil 141 with the second current causes the coil 141 to generate a magnetic field which has a different polarity as the first and second braking permanent magnets 161 and thus creates an attractive force between the fixed core assembly 14 and the permanent magnet assembly 16 which overcomes the magnetic attraction between the permanent magnet assembly 16 and the guide rail 12. Since the movable core 142 magnetically abuts with the permanent magnet assembly 16 and since the movement of the movable core 142 is constrained as described herein, the return of the permanent magnet assembly 16 to the fixed core assembly 14 is well controlled.

Figure 3:
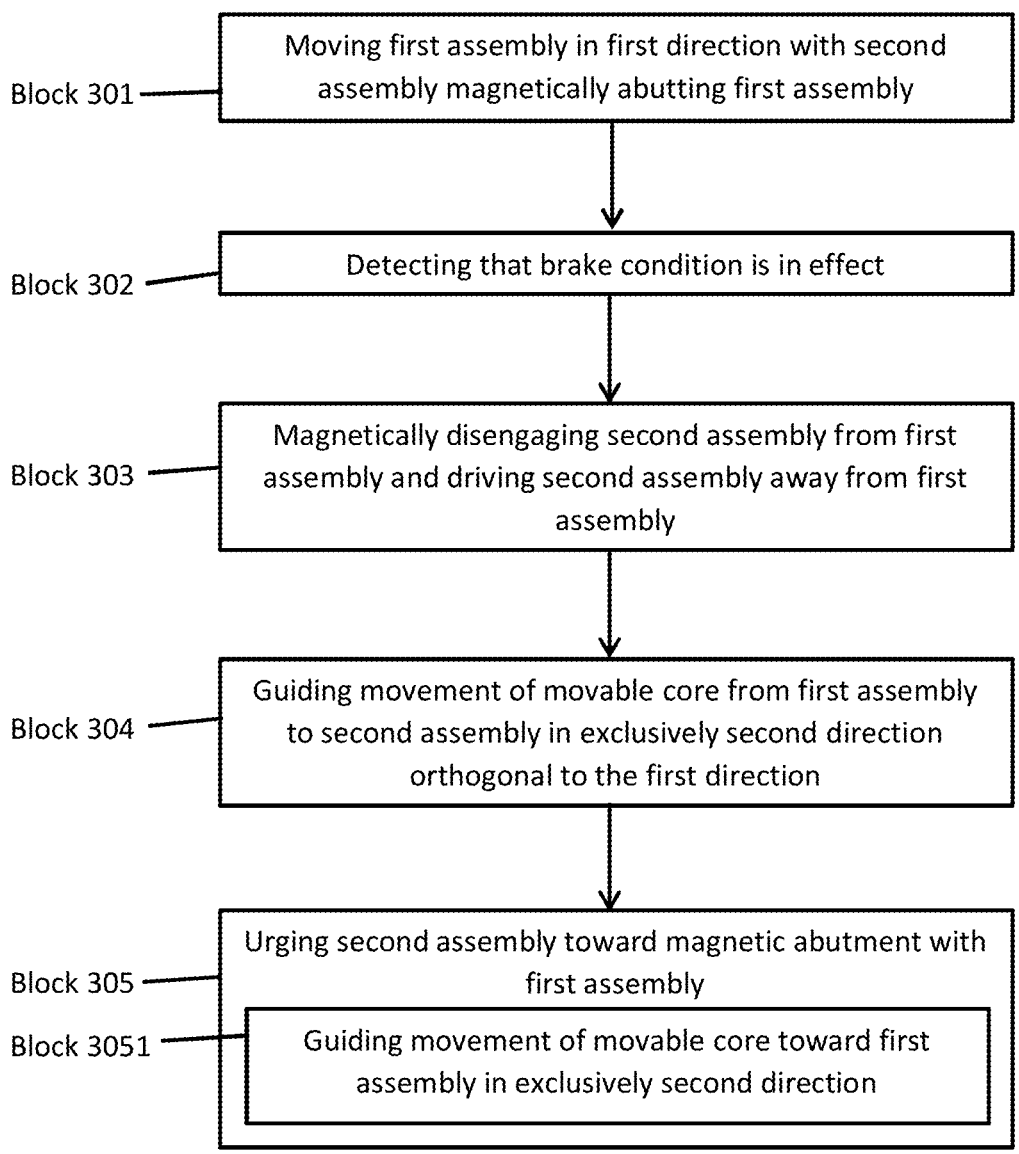
FIG. 3 is a flow diagram illustrating a method of operating an elevator system in accordance with embodiments.

With reference to FIG. 3, a method of operating an elevator system is provided. The method includes moving a first assembly in a first direction with a second assembly magnetically abutting the first assembly (block 301), detecting that a brake condition is in effect (block 302) and magnetically disengaging the second assembly from the first assembly and driving the second assembly away from the first assembly (block 303). The method further includes guiding movement of a movable core from the first assembly to the second assembly in exclusively a second direction which is orthogonal to the first direction (block 304) and urging the second assembly toward magnetic abutment with the first assembly (block 305). The urging of the second assembly toward magnetic abutment with the first assembly may include guiding movement of the movable core toward the first assembly in exclusively the second direction (block 3051).

In accordance with embodiments, the magnetically disengaging the second assembly from the first assembly and the urging of the second assembly toward magnetic abutment with the first assembly may include supplying a coil in the first assembly with opposing currents. In addition, a distance of travel of the second assembly may range from a lower range of a non-zero length to 0.5 mm and up to and including an upper range of 3.6 mm or greater.

The features described herein absorb gap variation and work properly with relatively large actuator-guide rail gaps (i.e., those which exceed about 3.6 mm) by improving magnetic efficiency. The features also reduce noise and wear by removing parts that exhibit relative movement to the system.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:
1. A bi-stable brake actuator, comprising:
a fixed core movable in a first direction;
a coil disposed in the fixed core and configured to generate magnetic fields of opposite polarities when supplied with opposing currents, respectively;

a movable core comprising first permanent magnets and second permanent magnets which face the fixed core, the movable core being disposed to move between retracted and extended positions with respect to the fixed core and the coil in exclusively a second direction defined orthogonally with respect to the first direction; and a permanent magnet assembly toward which the first permanent magnets face, and which is disposed to move between first and second positions in accordance with the coil being supplied with the opposing currents, respectively.

2. The bi-stable safety actuator according to claim 1, wherein:

the permanent magnet assembly remains in the first position with the movable core occupying the retracted position and the coil de-energized due to first magnetic attraction between the permanent magnet assembly and the first permanent magnets, the permanent magnet assembly is deployed to the second position by first energization of the coil, which overcomes the first magnetic attraction, and the movable core remains in the retracted position due to residual current in the coil and second magnetic attraction between the second permanent magnets and the fixed core, the movable core moves to the extended position with the coil de-energized due to the first magnetic attraction, and the permanent magnet assembly returns to the first position by second energization of the coil and drives the movable core back to the retracted position.

3. The bi-stable safety actuator according to claim 1, wherein the permanent magnet assembly comprises:

a housing; and first and second braking permanent magnets at opposite ends of the housing.

4. The bi-stable safety actuator according to claim 1, further comprising an elastic element interposed between the fixed core and the movable core.

5. The bi-stable safety actuator according to claim 1, wherein:

the fixed core is formed to define a first cavity sized to accommodate the coil and the movable core, the coil is formed to define a second cavity sized to accommodate the movable core and shaped to guide movements of the movable core between the retracted and extended positions, and the permanent magnet assembly borders the first and second cavities when occupying the first position.

6. The bi-stable safety actuator according to claim 1, wherein the second direction is perpendicular with respect to the first direction.

7. The bi-stable safety actuator according to claim 1, further comprising circuitry to which the coil is electrically coupled, the circuitry comprising:

a current source; and a controller to supply the coil with one of the first and second currents from the current source.

8. A bi-stable brake actuator for an elevator system in which an elevator car moves along a guide rail, the bi-stable safety actuator comprising:

a fixed core fixed to and movable with the elevator car in a first direction;

a coil disposed in the fixed core and configured to generate magnetic fields of first and second opposite polarities when supplied with first and second currents, respectively;

a movable core comprising first permanent magnets and second permanent magnets which face the fixed core, the movable core being disposed to move between retracted and extended positions with respect to the fixed core and the coil in exclusively a second direction defined orthogonally with respect to the first direction; and a permanent magnet assembly, toward which the first permanent magnets face, and which is movably coupled to the elevator car and disposed to move between movable core and guide rail abutment positions in accordance with the coil being supplied with the first and second currents, respectively.

9. The bi-stable safety actuator according to claim 8, wherein:

the permanent magnet assembly remains in the first position with the movable core occupying the retracted position and the coil de-energized due to first magnetic attraction between the permanent magnet assembly and the first permanent magnets, the permanent magnet assembly is deployed to the second position by first energization of the coil, which overcomes the first magnetic attraction, and the movable core remains in the retracted position due to residual current in the coil and second magnetic attraction between the second permanent magnets and the fixed core, the movable core moves to the extended position with the coil de-energized due to the first magnetic attraction, and the permanent magnet assembly returns to the first position by second energization of the coil and drives the movable core back to the retracted position.

10. The bi-stable safety actuator according to claim 8, wherein the permanent magnet assembly comprises:

a housing; and first and second braking permanent magnets at opposite ends of the housing.

11. The bi-stable safety actuator according to claim 8, further comprising an elastic element interposed between the fixed core and the movable core.

12. The bi-stable safety actuator according to claim 8, wherein the fixed core is formed to define a first cavity sized to accommodate the coil and the movable core.

13. The bi-stable safety actuator according to claim 12, wherein:

the coil is formed to define a second cavity sized to accommodate the movable core and shaped to guide movements of the movable core between the retracted and extended positions, and the permanent magnet assembly borders the first and second cavities when occupying the first position.

14. The bi-stable safety actuator according to claim 8, wherein the second direction is perpendicular with respect to the first direction.

15. The bi-stable safety actuator according to claim 8, further comprising circuitry to which the coil is electrically coupled.

16. The bi-stable safety actuator according to claim 15, wherein the circuitry comprises:

a current source; and a controller to supply the coil with one of the first and second currents from the current source.

17. The bi-stable safety actuator according to claim 8, wherein a distance between the permanent magnet assembly and the guide rail is from a lower range of a non-zero length to 0.5 mm and up to and including an upper range of 3.6 mm or greater.

18. A method of operating an elevator system, the method comprising:
- moving a first assembly comprising permanent magnets in a first direction with a second assembly magnetically abutting the first assembly;
- detecting that a brake condition is in effect;
- magnetically disengaging the second assembly from the first assembly and a movable core, which comprises first permanent magnets and second permanent magnets and is magnetically attracted to the first assembly, by overcoming a magnetic attraction between the second assembly and the movable core;
- driving the second assembly away from the first assembly and the movable core and into magnetic abutment with a guide rail;
- overcoming magnetic attraction between the movable core and the first assembly and guiding movement of the movable core from the first assembly to the second assembly in exclusively a second direction which is orthogonal to the first direction; and
- overcoming magnetic attraction between the second assembly and the guide rail by urging the second assembly and the movable core toward magnetic abutment with the first assembly,
- the urging of the second assembly toward magnetic abutment with the first assembly comprising guiding movement of the movable core toward the first assembly in exclusively the second direction.

19. The method according to claim 18, wherein the magnetically disengaging the second assembly from the first assembly and the urging of the second assembly toward magnetic abutment with the first assembly comprise supplying a coil in the first assembly with opposing currents.

20. The method according to claim 19, wherein a distance of travel of the second assembly is from a lower range of a non-zero length to 0.5 mm and up to and including an upper range of 3.6 mm or greater.

* * * * *